US012718183B2

(12) United States Patent
Naemura et al.

(10) Patent No.: US 12,718,183 B2
(45) Date of Patent: Aug. 25, 2026

(54) SYSTEM AND METHOD FOR SUPPORTING MANAGEMENT OF PRODUCTS AFTER SHIPPING

(71) Applicant: Hitachi Industrial Equipment Systems Co., Ltd., Tokyo (JP)

(72) Inventors: Makiko Naemura, Tokyo (JP); Tomohisa Kohiyama, Tokyo (JP); Akira Iyozumi, Tokyo (JP); Yuusuke Nakagawa, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 267 days.

(21) Appl. No.: 18/690,647

(22) PCT Filed: Nov. 16, 2022

(86) PCT No.: PCT/JP2022/042559
§ 371 (c)(1),
(2) Date: Mar. 8, 2024

(87) PCT Pub. No.: WO2023/090360
PCT Pub. Date: May 25, 2023

(65) Prior Publication Data

US 2024/0378545 A1 Nov. 14, 2024

(30) Foreign Application Priority Data

Nov. 16, 2021 (JP) ................................ 2021-186566

(51) Int. Cl.
*G06Q 10/0833* (2023.01)
*G01S 5/02* (2010.01)
*G01S 19/48* (2010.01)

(52) U.S. Cl.
CPC ........... *G06Q 10/0833* (2013.01); *G01S 5/02* (2013.01); *G01S 19/48* (2013.01)

(58) Field of Classification Search
CPC ........ G06Q 10/0833; G01S 5/02; G01S 19/48
(Continued)

(56) References Cited

U.S. PATENT DOCUMENTS 8,890,746 B2 * 11/2014 Alizadeh-Shabdiz ...................... G01S 5/0263 342/357.31
10,957,204 B1 3/2021 Kumar et al.
(Continued)

FOREIGN PATENT DOCUMENTS

JP 2001-74494 A 3/2001
JP 2002-60018 A 2/2002
(Continued)

OTHER PUBLICATIONS

International Search Report (PCT/ISA/210) issued in PCT Application No. PCT/JP2022/042559 dated Jan. 10, 2023 with English translation (6 pages).

(Continued)

*Primary Examiner* — Brady W Frazier
(74) *Attorney, Agent, or Firm* — Crowell & Moring LLP

(57) ABSTRACT

A system receives a first position data set indicating a first positioning position of a shipped product with first frequency and receives a second position data set indicating a second positioning position of the product with second frequency. The system displays, on a map, at least one of n first position display objects respectively indicating n first positions based on N first position data sets and m second position display objects respectively indicating m second positions based on M second position data sets. A display mode for the n first position display objects is different from a display mode for the m second position display objects.
(Continued)

The positioning type or the number of satellites is different between the first positioning position and the second positioning position.

10 Claims, 11 Drawing Sheets

(58) Field of Classification Search
USPC .................................................... 342/357.31
See application file for complete search history.

(56) References Cited

U.S. PATENT DOCUMENTS

| | | | |
|---|---|---|---|
| 2010/0073229 A1 | 3/2010 | Pattabiraman et al. | |
| 2013/0131973 A1 | 5/2013 | Friedler et al. | |
| 2016/0042317 A1* | 2/2016 | Goodman | G06Q 10/0833 705/341 |
| 2019/0156253 A1* | 5/2019 | Malyack | G06N 5/022 |
| 2019/0156283 A1* | 5/2019 | Abebe | G06F 18/24323 |
| 2019/0205829 A1* | 7/2019 | Abebe | G06Q 10/0833 |
| 2020/0143321 A1* | 5/2020 | Exner | G06Q 10/08355 |
| 2020/0167724 A1* | 5/2020 | Klitenik | G06Q 10/0833 |

FOREIGN PATENT DOCUMENTS

| | | | |
|---|---|---|---|
| JP | 2002-62158 | A | 2/2002 |
| JP | 2004-48473 | A | 2/2004 |
| JP | 2005-24568 | A | 1/2005 |
| JP | 2008-298484 | A | 12/2008 |
| JP | 2012-502299 | A | 1/2012 |
| JP | 2012-21850 | A | 2/2012 |
| JP | 2014-132711 | A | 7/2014 |
| JP | 2015-504517 | A | 2/2015 |
| JP | 2019-75730 | A | 5/2019 |
| JP | 2019-121052 | A | 7/2019 |

OTHER PUBLICATIONS

Japanese-language Written Opinion (PCT/ISA/237) issued in PCT Application No. PCT/JP2022/042559 dated Jan. 10, 2023 with English translation (9 pages).

Japanese-language Office Action issued in Japanese Application No. 2021-186566 dated Mar. 25, 2025 with English translation (14 pages).

* cited by examiner

11
Product
111
Driving Target
114
Sensor Group
112
Power Source
116
Storage Apparatus
117
Processor
113
GPS Module
118
UI Apparatus
115
Interface Apparatus
11
...
150
GPS Satellite
150
160
12
Administrator Terminal
14
13
Product Management Support System
132
Storage Apparatus
133
Processor
131
Interface Apparatus

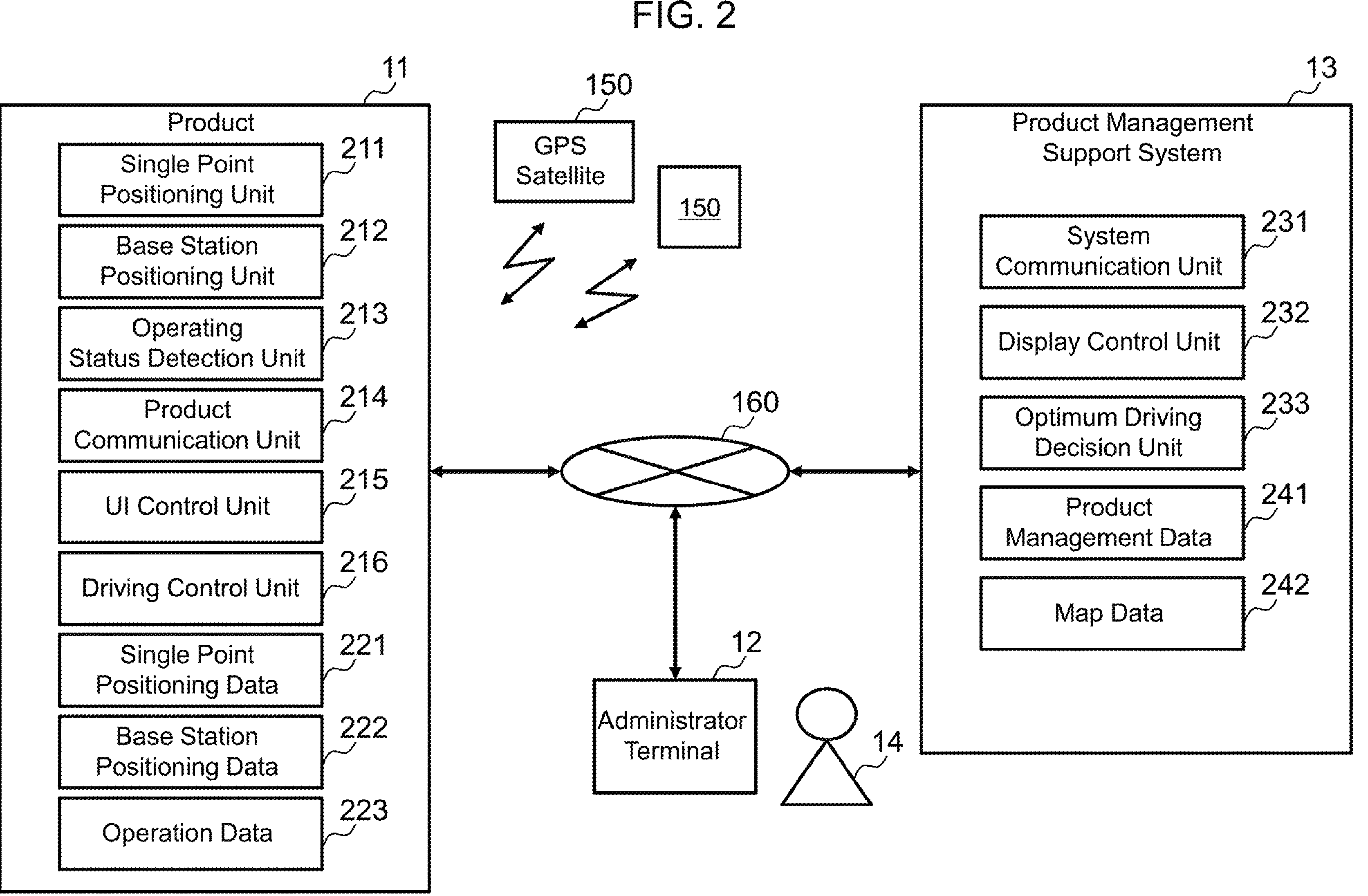
FIG. 2
11
Product
211
Single Point Positioning Unit
212
Base Station Positioning Unit
213
Operating Status Detection Unit
214
Product Communication Unit
215
UI Control Unit
216
Driving Control Unit
221
Single Point Positioning Data
222
Base Station Positioning Data
223
Operation Data
150
GPS Satellite
150
160
12
Administrator Terminal
14
13
Product Management Support System
231
System Communication Unit
232
Display Control Unit
233
Optimum Driving Decision Unit
241
Product Management Data
242
Map Data

FIG. 3

Single Point Positioning Data
221

| Time of Day | Value(s) | The Number of Satellites | Status |
|---|---|---|---|
| June 1, 2021 12:00:00 | A01, B01, C01 | P6 | Successful |
| June 1, 2021 12:01:00 | A02, B02, C02 | P1 | Failed |
| ... | ... | ... | ... |

FIG. 4

Base Station Positioning Data
222

| Time of Day | Value(s) | Status |
|---|---|---|
| June 1, 2021 12:00:00 | A11, B11, C11 | Successful |
| June 1, 2021 12:30:00 | A12, B12, C12 | Successful |
| ... | ... | ... |

FIG. 5

Operation Data
223

| Time of Day | Value(s) | Type |
|---|---|---|
| June 1, 2021 12:00:00 | X01 | Temperature |
| ... | ... | ... |

FIG. 6

Product Management Data
241

| Product ID | Time of Day | Single Point Positioning | | | Base Station Positioni | | Operation | |
|---|---|---|---|---|---|---|---|---|
| | | Position(s) | Status | The Number of Satellites | Position(s) | Status | Value(s) | Type |
| 0001 | June 1, 2021 12:00:00 | A01, B01, C01 | Successful | P6 | - | - | X01 | Temperature |
| | | | | | | | … | … |
| | … | … | … | | … | … | … | … |
| | June 1, 2021 12:00:30 | - | - | - | A11, B11, C11 | Successful | - | - |
| | … | … | … | … | … | … | … | … |
| | … | … | … | … | … | … | … | … |
| 0002 | … | … | … | … | … | … | … | … |
| … | … | … | … | … | … | … | … | … |

FIG. 10

START

S1001

First cycle?

NO

YES

S1002

Generate packet

S1003

Transmit the packet

START
Decide first position
S1101
Decide second position
S1102
Decide display mode
S1103
Place and display object at each position on map
S1104
END

SYSTEM AND METHOD FOR SUPPORTING MANAGEMENT OF PRODUCTS AFTER SHIPPING

TECHNICAL FIELD

The present invention generally relates to a technology for supporting management of products after shipping.

BACKGROUND ART

It is known that a server system collects operation data from products in order to manage the products after shipping (for example, PTL 1).

CITATION LIST

Patent Literature

PTL 1: Japanese Patent Application Laid-Open (Kokai) Publication No. 2019-121052

SUMMARY OF THE INVENTION

Problems to be Solved by the Invention

Generally, for the purpose of management of a product(s) after shipping, information (for example, a user name) about a user of the product (for example, an owner, a lender, or a borrower) is registered in a server system. Consequently, the user of the product is identified and appropriate services (for example, maintenance services) can be provided to the identified user.

However, the information about the user of the product after shipping is not necessarily registered actively.

Also, a shipping destination of the product may not always be the user of the product. For example, a certain entity may purchase many products from a product shipping source, manage them as inventory items, and possibly sell the products to various customers; and a product(s) used by a certain customer may possibly be sold to another person as an used item(s). In such a case, after registering information about a user regarding the product, the user of that product may possibly be changed and the information about the user does not necessarily be registered in the server system by the user who is a final buyer of the product.

There may be some products which can hardly be managed appropriately due to the reason described above.

As one method for solving this problem, a possible method is for a server system to collect position data sets indicating positions of a product from the product which is equipped with a positioning function for determining the position, and for the server system to estimate a user of the product based on the product positions indicated by the position data sets.

However, accuracy of the positions determined by positioning is not necessarily high.

Specifically speaking, for example, there are single point positioning and base station positioning as the positioning. The single point positioning is GNSS (Global Navigation Satellite System) positioning based on signals from satellites (for example, GPS (Global Positioning System) satellites). The base station positioning is positioning based on radio communication with a base station. The accuracy of the single point positioning is high; however, there is a high possibility that the single point positioning may fail (for example, the accuracy is low or the positioning cannot be performed) in an environment where the satellite signals (the signals from the satellites) cannot be received well (for example, indoors or underground). On the other hand, if the product exists in a communication area of the base station, the base station positioning is possible; however, the accuracy of the base station positioning is lower than the accuracy of the single point positioning. Incidentally, the "base station" herein used is a base station in a carrier network, but should not be limited to such base station (for example, the base station may be an access point for a wireless LAN (Local Area Network)). Moreover, the "base station positioning" is, for example, A-GPS (Assisted-GPS).

Moreover, the accuracy of the single point positioning may vary depending on the number of satellites on which the single point positioning is based. This is not limited to the single point positioning and the same also applies to other types of positioning based on the signals from the satellites.

Means to Solve the Problems

A system receives a first position data set indicating a first positioning position of a shipped product with first frequency and receives a second position data set indicating a second positioning position of the product with second frequency. The system displays, on a map, at least one of n first position display objects respectively indicating n first positions based on N first position data sets and m second position display objects respectively indicating m second positions based on M second position data sets. A display mode for the n first position display objects is different from a display mode for the m second position display objects. The first positioning position and the second positioning position fall under (A) or (B) below.

(A) The first positioning position is a position determined by single point positioning which is GNSS (Global Navigation Satellite System) positioning based on signals from satellites, and the second positioning position is a position determined by base station positioning which is positioning based on radio communication with a base station.

(B) Both the first positioning position and the second positioning position are positioned determined by positioning based on signals from satellites, but the number of satellites on which the positioning of the first positioning position is based is different from the number of satellites on which the positioning of the second positioning position is based.

Advantageous Effects of the Invention

According to the present invention, it is possible to support the administrator to accurately estimate a user of the product after shipping on the basis of the collected position data sets.

BRIEF DESCRIPTION OF DRAWINGS

FIG. 2 illustrates a functional configuration example of a product and a product management support system;

FIG. 3 illustrates a configuration example of single point positioning data;

FIG. 4 illustrates a configuration example of base station positioning data;

FIG. 5 illustrates a configuration example of operation data;

FIG. 6 illustrates a configuration example of product management data;

FIG. 10 illustrates an example of a flow of operation data set transmission processing;

DESCRIPTION OF EMBODIMENTS

Figure 1:
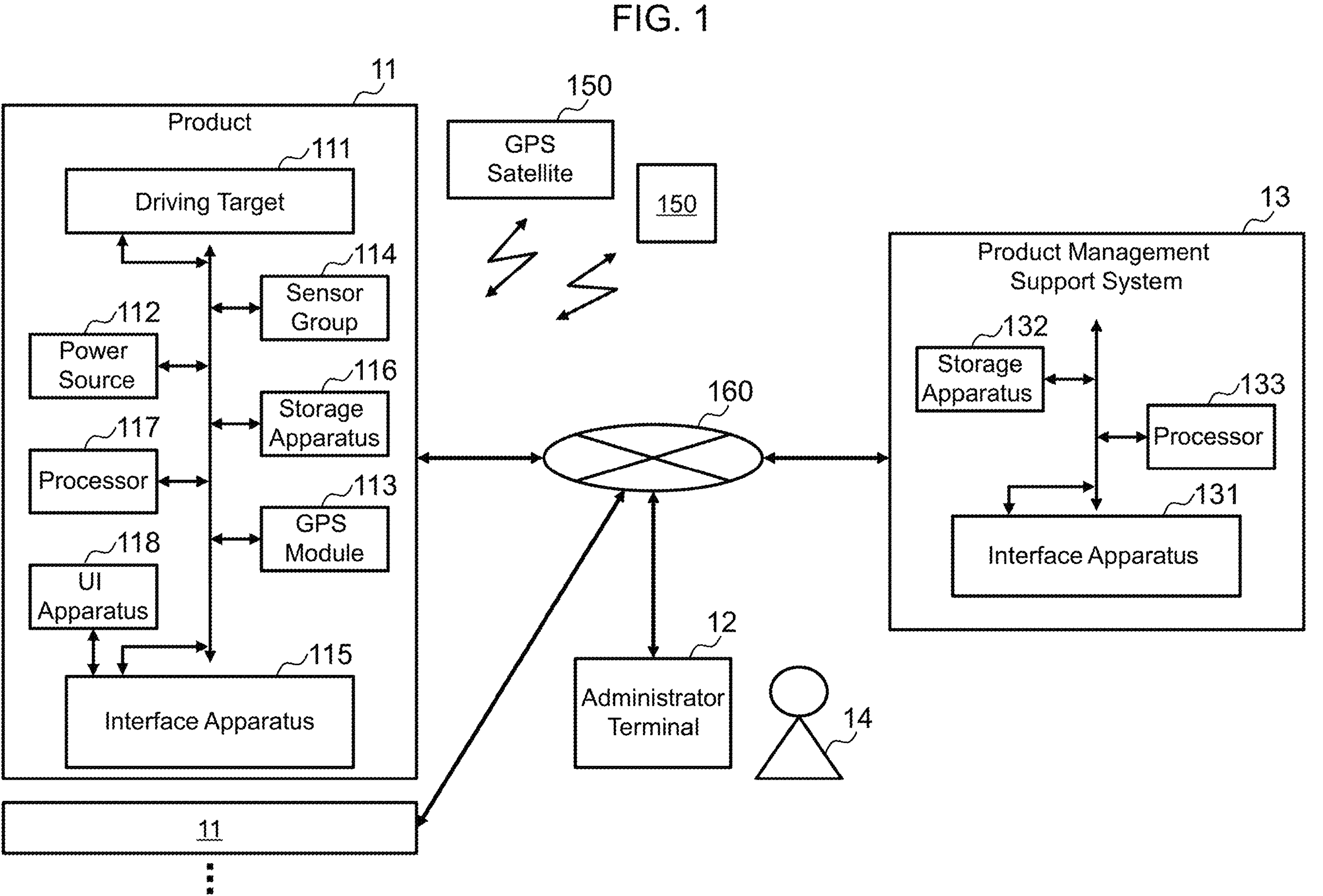
FIG. 1 illustrates a configuration example of the entire system according to an embodiment.

In the description indicated below, an "interface apparatus" may be one or more interface devices. The one or more interface devices may be at least one of the following:

One or more I/O (Input/Output) interface devices. The I/O (Input/Output) interface device is an interface device for at least one of an I/O device and a remote display computer. The I/O interface device for the display computer may be a communication interface device. At least one I/O device may be a user interface device, for example, either one of input devices such as a keyboard and a pointing device, and output devices such as a display device.

One or more communication interface devices. The one or more communication interface devices may be one or more communication interface devices of the same type (for example, one or more NICs [Network Interface Cards]) or two or more communication interface devices of different types (for example, an NIC and an HBA [Host Bus Adapter]).

Furthermore, in the description indicated below, a "memory" is one or more memory devices, which are an example of one or more storage devices, and may typically be a main storage device. At least one memory device in the memory may be a volatile memory device or a nonvolatile memory device.

Furthermore, in the description indicated below, a "persistent storage apparatus" is one or more persistent storage devices which are an example of one or more storage devices. The persistent storage device may typically be a nonvolatile storage device (such as an auxiliary storage device) and may specifically be, for example, an HDD (Hard Disk Drive), an SSD (Solid State Drive), an NVMe (Non-Volatile Memory Express) drive, or an SCM (Storage Class Memory).

Furthermore, in the description indicated below, a "storage apparatus" may be a memory and at least a memory for the persistent storage apparatus.

Furthermore, in the description indicated below, a "processor" may be one or more processor devices. At least one processor device may typically be a microprocessor device like a CPU (Central Processing Unit), but may be a processor of other types such as a GPU (Graphics Processing Unit). At least one processor device may be a single core processor or a multi-core processor. At least one processor device may be a processor core. At least one processor device may be a processor device in a broad sense such as a circuit which is an aggregate of gate arrays using a hardware description language for performing part or whole of processing (for example, FPGA [Field-Programmable Gate Array], CPLD [Complex Programmable Logic Device], or ASIC [Application Specific Integrated Circuit]).

Furthermore, in the description indicated below, a function may be sometimes described by the expression "yyy unit"; however, the function may be implemented by execution of one or more computer programs by a processor, or may be implemented by one or more hardware circuits (such as FPGA or ASIC), or may be implemented by a combination of the above. If the function is implemented by the execution of a program by the processor, specified processing is performed by using, for example, storage apparatuses and/or interface apparatuses as appropriate and, therefore, the function may be considered as at least part of the processor. The processing explained by referring to the function as a subject may be the processing executed by the processor or an apparatus which has that processor. The program(s) may be installed from a program source. The program source may be, for example, a program distribution computer or a computer-readable recording medium (such as a non-transitory recording medium). An explanation of each function is one example, and a plurality of functions may be gathered as one function or one function may be divided into a plurality of functions.

Moreover, in the following explanation, when describing elements of the same type without distinguishing between them, a common numeral in their reference numerals is used; and when distinguishing between the elements of the same type, the reference numerals may be used.

Furthermore, in the following explanation, a "data set(s)" is one chunk of logical electronic data as viewed from a program such as an application program and may be any one of, for example, a record(s), a file(s), a key value pair(s), and a tuple(s).

An explanation will be provided below about one embodiment of the present invention. In the embodiment below, a first positioning position(s) is a position(s) determined by the single point positioning which is GNSS (Global Navigation Satellite System) positioning based on signals from satellites and a second positioning position(s) is a position(s) determined by base point positioning which is positioning based on radio communication with a base station. Also, in the embodiment below, GPS satellites are adopted as the satellites, but the satellites to be used for positioning may be satellites other than the GPS satellites.

FIG. 1 illustrates a configuration example of the entire system according to an embodiment.

There are a plurality of products (or one product) 11 each of which has been shipped, a product management support system 13 which manages these products 11, and an administrator terminal 12 which communicates with the product management support system 13. In this embodiment, the product(s) 11 may be an industrial machine(s) such as a compressor(s); however, the product(s) 11 which is a management object(s) may be an apparatus(es) other than industrial machines (for example, any apparatus which requires power activation to be operated) or any product(s) other than the apparatus(es).

The product 11 includes a driving target 111, a power source 112, a GPS module 113, a sensor group 114, an interface apparatus 115, a storage apparatus 116, and a processor 117 connected to them. Also, the product 11 includes a UI (User Interface) apparatus 118 connected to the interface apparatus 115. At least some of elements 112 to 118 other than the driving target 111 may be built into the product 11 or be attached externally to the product 11. For example, one or a plurality of modules, each of which includes the elements 112 to 118, may be attached to the product 11. Specifically, for example, the product 11 may include a mobile communication terminal and the mobile communication terminal may be equipped with functions as the GPS module 113 and include the UI apparatus 118.

The driving target 111 is a target to be driven (for example, including various equipment such as a motor) for the purpose of the operation of the product 11. The driving target 111 may include at least part of the processor 117.

The power source 112 supplies various electric power at the product 11. The power source 112 may be a power circuit or a battery which is connected to utility power.

The GPS module 113 is a module for receiving a GPS signal(s) from a GPS satellite(s) 150.

The sensor group 114 is one or a plurality of sensors. Each sensor may be an arbitrary sensor such as a temperature sensor, a rotary encoder, or the like.

The interface apparatus 115 includes an interface device for radio communication via a communication network 160 and an interface device with the UI apparatus 118. The storage apparatus 116 stores computer programs to be executed by the processor 117 and data to be referenced or updated by the processor 117. The processor 117 executes the computer programs stored in the storage apparatus 116.

The UI apparatus 118 is one or a plurality of input-output devices (for example, at least one of a touch panel, buttons, LEDs, a microphone, and a speaker) which receive some kind of inputs from a user and provide some kind of outputs to the user.

The product management support system 13 includes an interface apparatus 131, a storage apparatus 132, and a processor 133 connected to them. The interface apparatus 131 is an apparatus for communication via the communication network 160. The storage apparatus 132 stores computer programs to be executed by the processor 133 and data to be reference or updated by the processor 133. The processor 133 executes the computer programs stored in the storage apparatus 132. In this embodiment, the product management support system 13 is a physical computer system configured by one or more physical computers; however, instead of the physical computer system, the product management support system 13 may be a logical computer system (for example, a cloud computing service) based on a physical computer system (for example, a could infrastructure). The product management support system 13 displays information on the administrator terminal 12 (that is, provides the information displayed on the administrator terminal 12). Moreover, the product management support system 13 (server) performs processing in response to a request from the administrator terminal 12 (client) and provides information as a result of the processing.

The administrator terminal 12 is an information processing terminal such as a personal computer or a smartphone. The administrator terminal 12 displays information from the product management support system 13 and sends a request to the product management support system 13 in accordance with an operation by the administrator 14.

FIG. 2 illustrates a functional configuration example of the product 11 and the product management support system 13.

The communication network 160 includes a network (for example, a mobile phone network or a wireless LAN) with a base station at its end (for example, a base station provided by a communication carrier and an access point of the wireless LAN). The product 11 is capable of bidirectional (or unidirectional) communication with the product management support system 13 through the communication network 160.

The product 11 includes a single point positioning unit 211, a base station positioning unit 212, an operating status detection unit 213, a product communication unit 214, a UI control unit 215, and a driving control unit 216. At least some of these functions may be built into the product 11 or be included in one or a plurality of modules which are externally attached to the product 11. Moreover, the storage apparatus 116 for the product 11 stores single point positioning data 221, base station positioning data 222, and operation data 223.

The single point positioning unit 211 performs single point positioning. Specifically speaking, the single point positioning unit 211 determines the position of the product 11 by using a known GPS positioning method based on GPS signals from the GPS satellites 150. The single point positioning unit 211 stores a first position data set, which is a position data set indicating the determined position (a single point positioning position), in the single point positioning data 221. The single point positioning data 221 has records for respective first position data sets as illustrated in FIG. 3 and each record includes information that the first position data set has. For example, each record includes information that is a time of day (the time of day when the single point positioning was performed), a value (the value indicating the single point positioning position (for example, a latitude, longitude, and altitude)), the number of satellites (the number of GPS satellites based on which the single point positioning was performed), and the status (whether the single point positioning was successful or failed). Incidentally, the single point positioning unit 211 may be implemented by the GPS module 113 or the GPS module 113 may be a GPS antenna and the processor 117 may function as the single point positioning unit 211 which performs the single point positioning based on the GPS signal received by the GPS antenna. The single point positioning may be performed in response to a request from the product management support system 13 or may be performed spontaneously.

The base station positioning unit 212 performs base station positioning. Specifically speaking, the base station positioning unit 212 may determine the position based on the radio communication with the base station. Specifically, for example, the base station positioning unit 212 may determine the position based on, for example, satellite orbit data received via a base station from a server of a communication carrier and a time-of-day signal from the GPS satellite 150. That positioning may be based on reception strength of the signal from the base station. The base station positioning unit 212 stores a second position data set, which is a position data set indicating the position determined by such base station positioning (a base station positioning position), in the base station positioning data 222. The base station positioning data 222 has records for respective second position data sets as illustrated in FIG. 4 and each record includes information that the second position data set has. For example, each record includes information that is a time of day (the time of day when the base station positioning was performed), a value (the value indicating the base station positioning position), the number of satellites, and the status (whether the base station positioning was successful or failed). The frequency of the base station positioning is lower than the frequency of the single point positioning (for example, the base station positioning is performed at an arbitrary timing and an average value of an execution interval of the base station positioning is longer than an average value of the execution interval of the single point positioning (for example, a cycle of the single point positioning)). The base station positioning may be performed in response to a request from the product management support system 13 or may be performed spontaneously. Incidentally, the base station positioning (at least transmission of the second position data set indicating the base station positioning position to the product management support system 13) may be performed once an approval (permission) for the base station position is granted by the user. Moreover, when the base station positioning is compared to the single point positioning, lots of communications traffic occurs during the base station positioning. This is become the communications with the server of the communication carrier are required for the positioning.

The operating status detection unit 213 stores an operation data set(s), which is a data set(s) from the sensor(s) in the sensor group 114, in the operation data 223. The operation data 223 has records of respective operation data sets as illustrated in FIG. 5 and each record includes information that the operation data set has. For example, each record includes information, that is, a time of day (the time of day when the measurement was conducted by the sensor), a value (the value measured by the sensor), and a type (the type of the value acquired by the sensor).

The product communication unit 214 transmits a first position data set from the single point positioning unit 211 (for example, the first position data set acquired from the single point positioning data 221) to the product management support system 13 with first frequency (for example, in a first cycle). Moreover, the product communication unit 214 transmits a second position data set from the base station positioning unit 212 (for example, the second position data set acquired from the base station positioning data 222) to the product management support system 13 with second frequency (for example, in a second cycle). The second frequency is lower than the first frequency.

Incidentally, the product communication unit 214 transmits a packet to the product management support system 13 with the first frequency. The packet may be transmitted in response to a request from the product management support system 13 or may be transmitted spontaneously (without any request from the product management support system 13). The packet may be data including at least one operation data set (for example, the operation data set acquired from the operation data 223) which was acquired from the operating status detection unit 213 after the previous packet transmission and until the latest packet transmission (that is, which was acquired in a packet transmission cycle) and may be data collected by the product management support system 13 with the first frequency. At least one first position data set which was acquired by the single point positioning unit 211 in the packet transmission cycle (for example, the first position data set acquired from the single point positioning data 221) will be included in an empty space of the packet. The packet transmission cycle does not have to be the same as the single point positioning cycle, but the packet transmission cycle and the single point positioning cycle are the same in this embodiment.

Furthermore, a product ID (information corresponding to an ID of the product 11 itself or identification information of the product 11 (for example, information corresponding at the ratio of 1:1 to the identification information of the product)) is associated with the data transmitted from the product communication unit 214. The product management support system 13 can identify the product ID from the data from the product communication unit 214.

The UI control unit 215 controls the UI apparatus 118. For example, the UI control unit 215 controls display of a touch panel as at least part of the UI apparatus 118.

The driving control unit 216 controls driving of the driving target 111.

The product management support system 13 includes a system communication unit 231, a display control unit 232, and an optimum driving decision unit 233. Also, product management data 241 and map data 242 are stored in the storage apparatus 132 for the product management support system 13. Incidentally, the map data 242 may be map data provided by a site outside the product management support system 13.

The system communication unit 231 transmits/receives data to/from the product communication unit 214 of the product 11 via the communication network 160. For example, the system communication unit 231 receives a packet(s) (the packet including the first position data set and the operation data set) and a second position data set from the product communication unit 214 and stores the received data sets in the product management data 241. The product management data 241 has records for respective packets or second position data sets as illustrated in FIG. 6 and each record includes information that the received packet or second position data set has. For example, each record includes information, that is, a product ID (the product ID specified from the packet or the second position data set), a time of day (the reception time of day of the packet or the second position data set or the time of day identified from the received packet or second position data set), single point positioning information (for example, all or some information which one or more first position data sets included in one packet respectively have (for example, a single point positioning position, a status, and the number of satellites)), base station positioning information (for example, all or some information which the second position data set has (for example, a base station positioning position and a status), and operation information (for example, all or some information which one or more operation data sets included in one packet have (for example, a measured value and a type)).

The display control unit 232 displays, on a map, at least one of n first position display objects which indicate n first positions based on N first position data sets, respectively, and m second position display objects which indicate m second positions based on M second position data sets, respectively. The location where the map is displayed is the administrator terminal 12 in this embodiment, but an apparatus other than the administrator terminal 12 may be the display location. For example, if the product management support system 13 is an information processing terminal (for example, the product management support system 13 is integrated with the administrator terminal 12), the display location may be a display device which that information processing terminal has. The map to be displayed is based on the map data 242. For example, a first position display object is displayed at the position corresponding to a first position among map images based on the map data 242 and a second position display object is displayed at the position corresponding to a second position among the map images.

The "first position" may be either a single point positioning position or a position decided by the display control unit 232 based on one or more single point positioning positions. The "second position" may be either a base station positioning position or a position decided by the display control unit 232 based on one or more base station positioning positions. In this embodiment, N is equal to n (N=n) and the first position may be a single point positioning position indicated by a first position data set; and M is equal to m (M=m) and the second position may be a base station positioning position indicated by a second position data set.

Each of N, n, M, and m is an integer equal to 0 or more. Each value of N, n, M, and m varies depending on a condition(s) regarding display objects. For example, if the condition is set about a time period, that is, if there is no first position data set or second position data set indicating the position for which the positioning was successful regarding times of day belonging to a display object time period, the values of N, n, M, and m are N=n=0 and M=m=0. If the condition is set about top N first position data sets whose single point positioning times of day are new among first position data sets for which the single point positioning was successful, the values of N and n are N=n≥1; and M second position data sets are M second position data sets whose times of day belong to a time-of-day range corresponding to the above-mentioned N first position data sets (the display object time period), and the values of N and M are N>M≥0. If the display object time period is the same regarding the single point positioning positions and the base station positioning positions, n is typically larger than m (n>m). This is because a cycle of the single point positioning is shorter than that of the base station positioning and, therefore, there are more single point positioning positions than the base station positioning positions.

The optimum driving decision unit 233 decides control information for optimum driving control of the product 11. The decided control information is transmitted by the system communication unit 231 to that product 11. At the product 11, the driving control unit 216 controls the driving target 111 based on that control information.

Examples of processing performed in this embodiment will be explained below.

Figure 7:
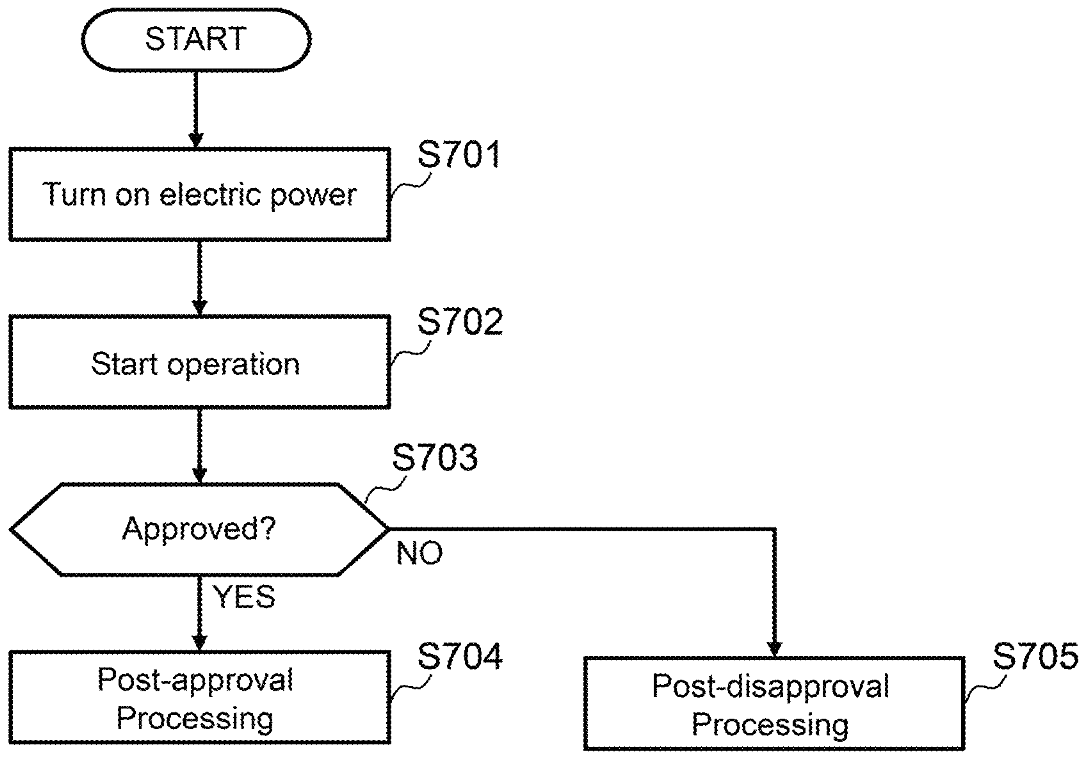
FIG. 7 illustrates an example of a flow of the entire processing of a shipped product 11.

FIG. 7 illustrates an example of a flow of the entire processing performed regarding a shipped product 11.

Regarding the shipped product 11, the power source 112 for the product 11 is turned on at the position where that product 11 is to be used (S701). As a result, the operation of the product 11 is started (S702) and the communication (for example, regular communication) between the product 11 and the product management support system 13 is started.

The UI control unit 215 for the product 11 outputs an inquiry on whether to approve the base station positioning or not, via the UI apparatus 118 (for example, display or sound output) (S703). This inquiry may be output from the system communication unit 231 for the product management support system 13 through the product communication unit 214 and the UI control unit 215. A response to this inquiry is input by the user.

If the response to the inquiry in S703 is an approval (S703: YES), post-approval processing is performed (S704). The post-approval processing includes the base station positioning in a second cycle in addition to the single point positioning in the first cycle. Also, the post-approval processing includes transmission of a notice of the approval (and the product ID of the relevant product) from the product 11 to the product management support system 13. When receiving this notice, the system communication unit 231 for the product management support system 13 is designed to transmit a request for the base station positioning to the relevant product 11 in the second cycle. Regarding the product management data 241, a record corresponding to the product 11 may include information indicating the status of the product 11 (whether the power is turned on or not and whether the base station positioning is approved or not) and the product management support system 13 may recognize the status of the shipped product 11 based on that information.

On the other hand, if the response to the inquiry in S703 is a disapproval (S703: NO), post-disapproval processing is performed (S705). The post-disapproval processing does not include at least the base station positioning in the second cycle.

Processing performed in the post-approval processing will be explained below. Incidentally, in S703 to S705, the approval or the disapproval of the base station positioning is input via the UI apparatus 118, but it may be input to the product management support system 13 by other kinds of methods (for example, a specified contract may be made by a method using paper or by other methods and settings pursuant to such contract may be set to the product management support system 13).

Figure 8:
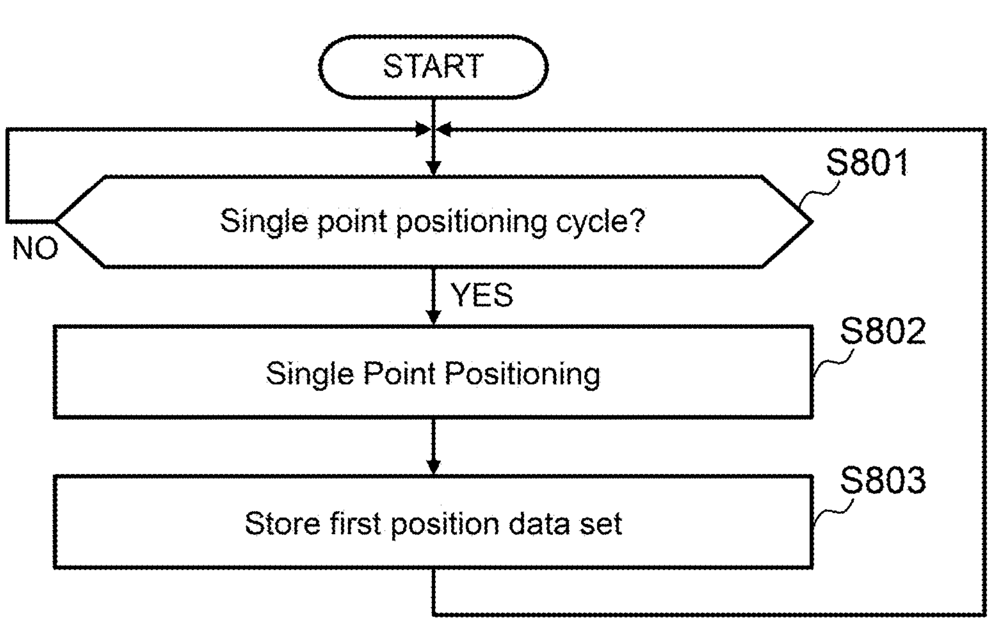
FIG. 8 illustrates an example of a flow of single point positioning processing.

FIG. 8 illustrates an example of a flow of single point positioning processing by the product 11.

When a single point positioning cycle (a specified cycle) has elapsed since the immediately preceding single point positioning (S801: YES), the single point positioning unit 211 performs the single point positioning (S802) and stores a first position data set in the single point positioning data 221 (S803).

Figure 9:
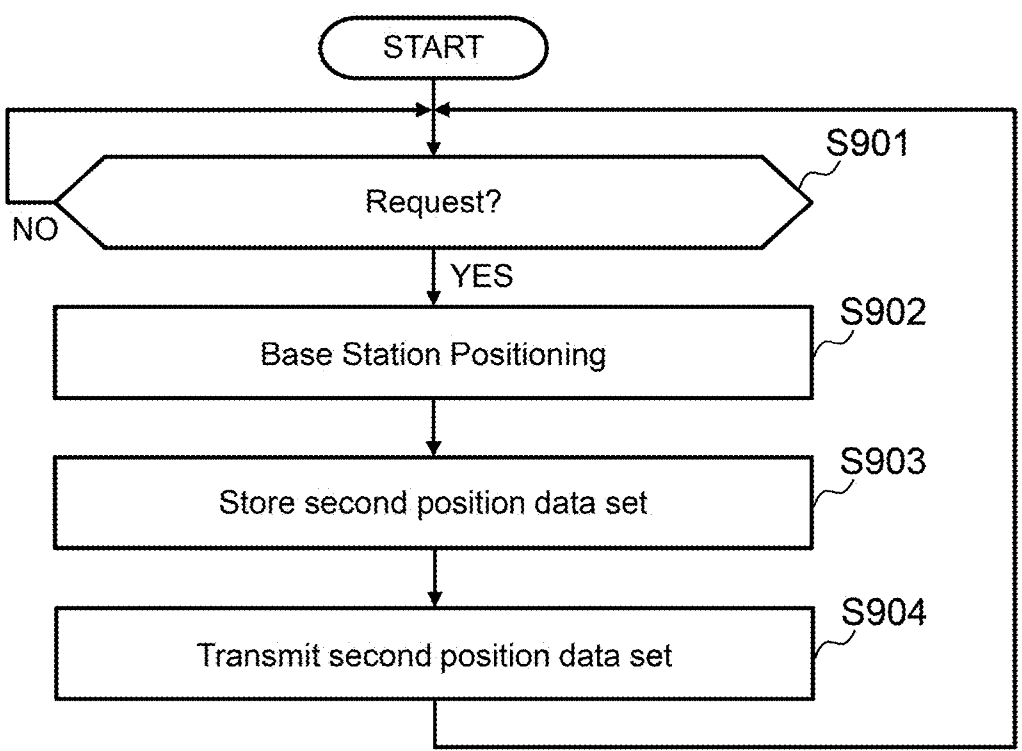
FIG. 9 illustrates an example of a flow of base station positioning processing.

FIG. 9 illustrates an example of a flow of base station positioning processing by the product 11.

The single point positioning is performed cyclically (the single point positioning may be performed at an arbitrary timing of the product 11), while the base station positioning is performed at an arbitrary timing of the product management support system 13 (the base station positioning may be performed in a longer cycle than that of the single point positioning or may be performed at an arbitrary timing of the product 11). Specifically, the system communication unit 231 for the product management support system 13 is designed to transmit a request for the base station positioning at an arbitrary timing. When the base station positioning unit 212 receives that request via the product communication unit 214 (S901: YES), it performs the base station positioning (S902) and stores a second position data set in the base station positioning data 222 (S903). The product communication unit 214 transmits that second position data set to the product management support system 13. The system communication unit 231 for the product management support system 13 receives the second position data set and stores it in the product management data 241.

Figure 10:
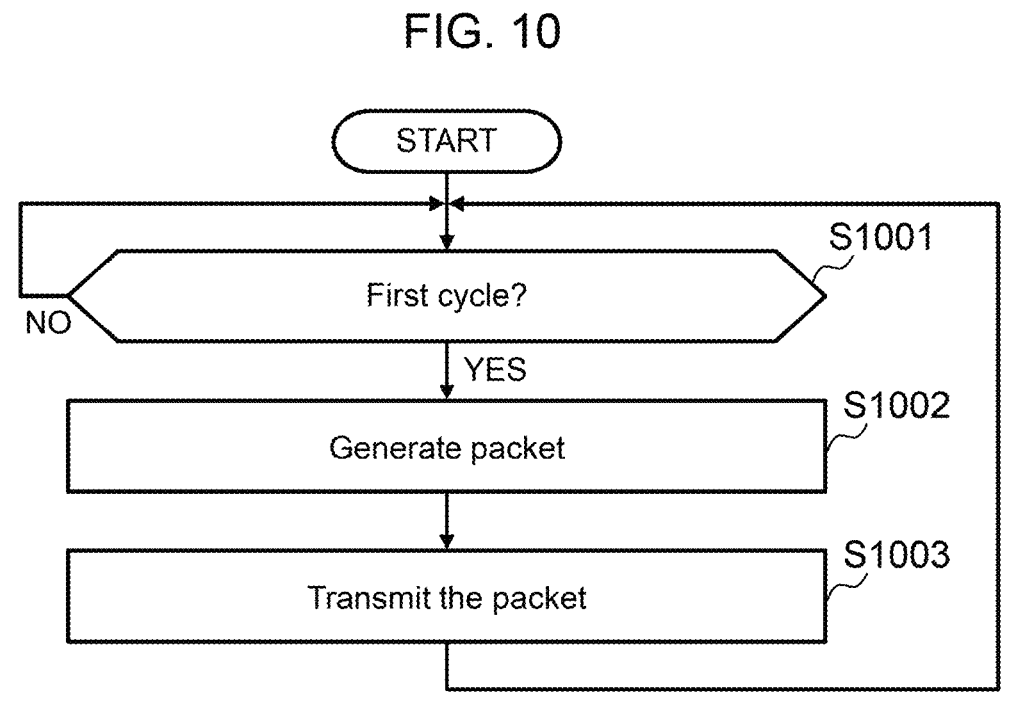

FIG. 10 illustrates an example of a flow of operation data set transmission processing by the product 11.

Operation data sets are accumulated in the operation data 223 by a processing flow which is not illustrated in the drawing. If a first cycle has elapsed since the immediately preceding transmission of a transmission object packet (S1001: YES), the product communication unit 214 generates a packet (S1002) and transmits that packet to the product management support system 13 (S1003). That packet includes an operation data set and a first position data set which are acquired in the latest first cycle (after the immediately preceding packet generation until the latest packet generation). The system communication unit 231 receives that packet and stores the operation data set and the first position data set in that packet in the product management data 241.

The operation data set(s) is transmitted to the product management support system 13, for example, cyclically as described above. That cycle may be different from the cycle of the single point positioning; however, in this embodiment, the first position data set is transmitted together with the operation data set.

Figure 11:
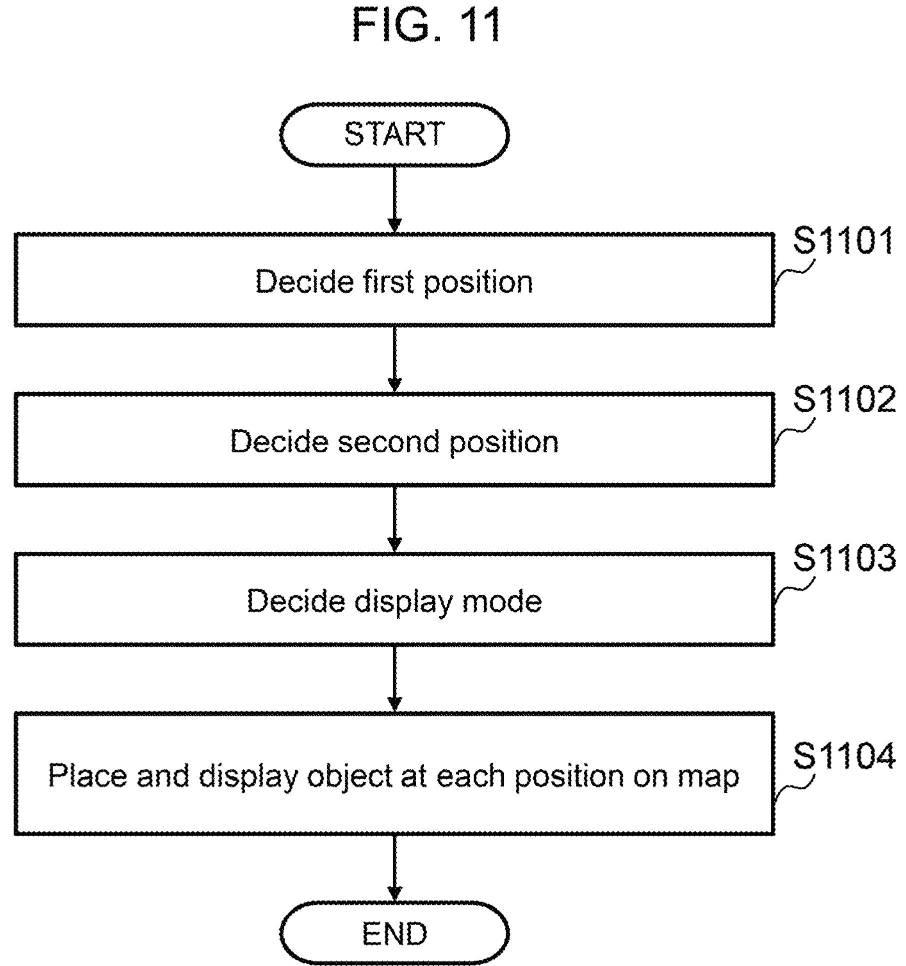
FIG. 11 illustrates an example of a flow of product management support processing.

FIG. 11 illustrates an example of a flow of product management support processing by the product management support system 13.

For example, if the display control unit 232 receives a request for displaying a product position screen from the administrator terminal 12, this processing may be performed in response to that request. That request may designate display conditions which are conditions regarding display (for example, a time period, an area, or a product ID). For example, the display control unit 232 can receive a request, which designates an ID (for example, an individual identification number) of a compressor as one example of the product, from the administrator terminal 12 and perform processing in S1101 and subsequent steps regarding that compressor.

The display control unit 232 identifies N first position data sets, which are applicable as the display conditions, from the product management data 241 and decides n first positions based on the N first position data sets (S1101).

The display control unit 232 identifies M second position data sets, which are applicable as the display conditions, from the product management data 241 and decides m second positions based on the M first position data sets (S1102).

The display control unit 232 decides respective display modes for the n first position display objects corresponding to the n first positions, respectively, and decides respective display modes for the m second position display objects corresponding to the m second positions, respectively. (S1103).

The display control unit 232 places n first position display objects and m second position display objects on a map (map image) and displays the map, on which these position display objects are placed, on the administrator terminal 12 (S1104).

Figure 12:
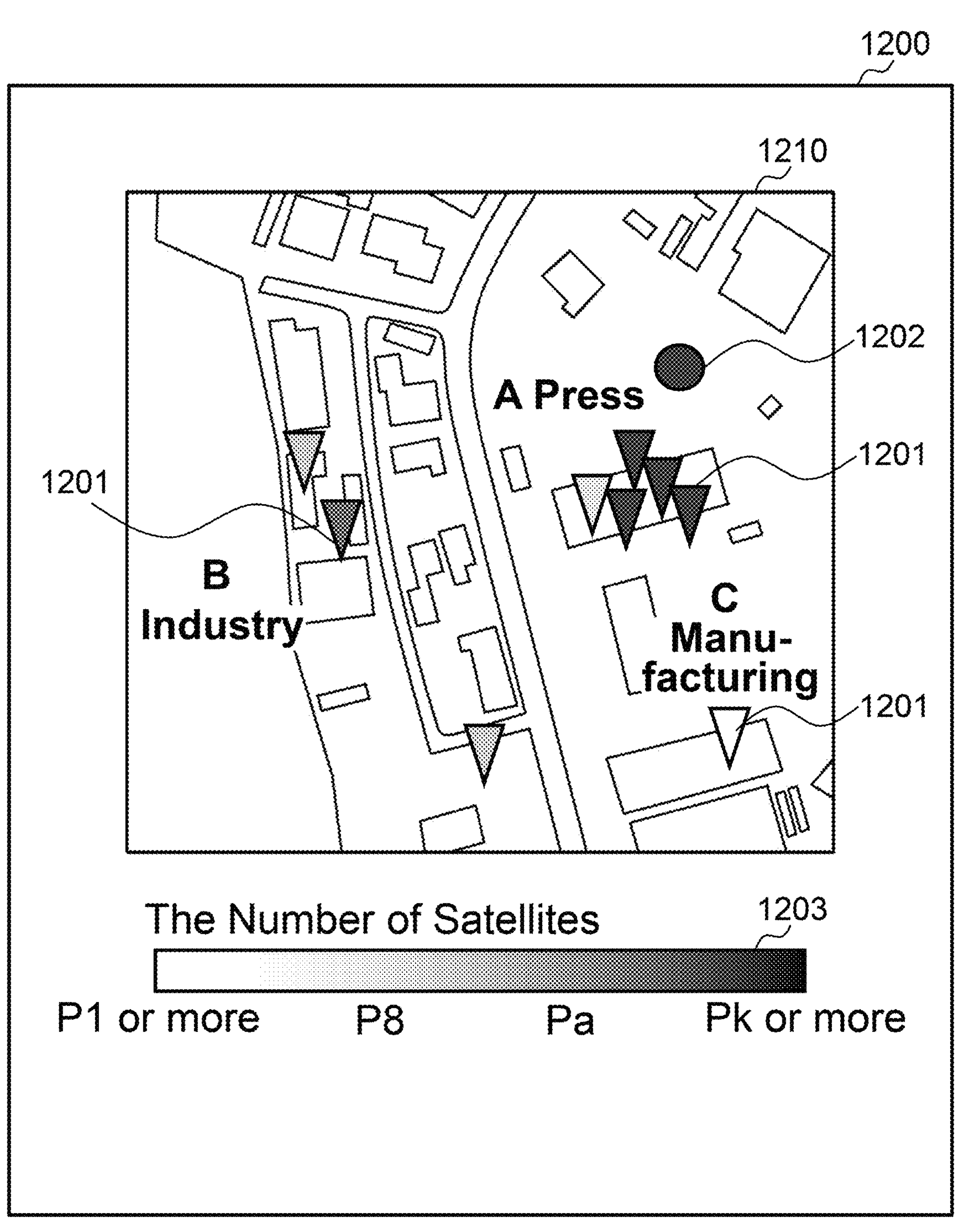
FIG. 12 illustrates an example of a product position screen.

FIG. 12 illustrates an example of the product position screen to be displayed on the administrator terminal 12 as a result of S1104.

A product position screen 1200 is typically a GUI (Graphical User Interface). The product position screen 1200 displays a map UI 1210 and an accuracy index UI 1203.

The map UI 1210 has a map based on the map data 242 and a first position display object(s) 1201 and a second position display object(s) 1202 which are placed on the map. Each one of the position display objects 1201 and 1202 is located at a position corresponding to the relevant position display object (a first position or a second position) on the map. In this embodiment, both the first position display objects 1201 and the second position display object 1202 are shapes.

The display mode (for example, the shape) of a position display object corresponding to the relevant position varies depending on whether the position is a first position or a second position. Moreover, regarding each first position, the display mode (for example, color intensity) of the first position display object 1201 varies depending on the accuracy of the relevant first position. An index for accuracy of the first position is the number of GPS satellites on which, for example, the single point positioning was based.

The accuracy index UI 1203 indicates the relationship between the accuracy of the position and the display mode of the position display object corresponding to the relevant position. In an example illustrated in FIG. 12, the accuracy index UI 1203 is a rectangular bar which extends in a specified direction (for example, a horizontal direction); and it indicates that as the number of satellites becomes larger, the color of the first position display object becomes darker.

In the example illustrated in FIG. 12, first positions and a second position are displayed regarding the target product (for example, a product designated by an administrator). The administrator 14 can estimate that a user of the target product is currently "A Press." This is because relatively many first position display objects 1201 whose colors are dark are located at the premises of "A Press" and the second position display object 1202 is also located at the premises of "A Press."

Incidentally, the position display objects may be display objects which are not shapes (for example, texts) instead of or in addition to the shapes. Moreover, the display mode of the position display objects may be an aspect other than the color intensity (for example, an aspect such as the colors themselves or their transmissivity) instead of or in addition to the color intensity.

Furthermore, each of N and n may be an integer equal to 0 or more. For example, if the administrator 14 has never succeeded in the single point positioning of the target product within a certain period of time in the past since they made a request for display of the product position screen, N and n may be zero (N=n=0).

Furthermore, the value of N may be a fixed value or any arbitrary value decided by the administrator 14. For example, n first positions based on top N first position data sets with times of day close to the time of day when the administrator 14 requested for the display of the product position screen may be display objects. Also, each one of these first position data sets may be first position data sets regarding which the single point positioning was successful. Moreover, the value of M may be the number of second position data sets belonging to a time-of-day range corresponding to the N first position data sets. If there are no such second position data sets, M is zero (M=0).

Furthermore, in this embodiment, N is equal to n (N=n), but N may be not equal to n (N≠n). For example, a plurality of first positions may be decided by the display control unit 232 based on one first position data set or one first position may be decided by the display control unit 232 based on a plurality of first position data sets. Similarly, in this embodiment, M is equal to m (M=m), but M may be not equal to m (M≠m). For example, a plurality of second positions may be decided by the display control unit 232 based on one second position data set or one second position may be decided by the display control unit 232 based on a plurality of second position data sets.

Figure 13:
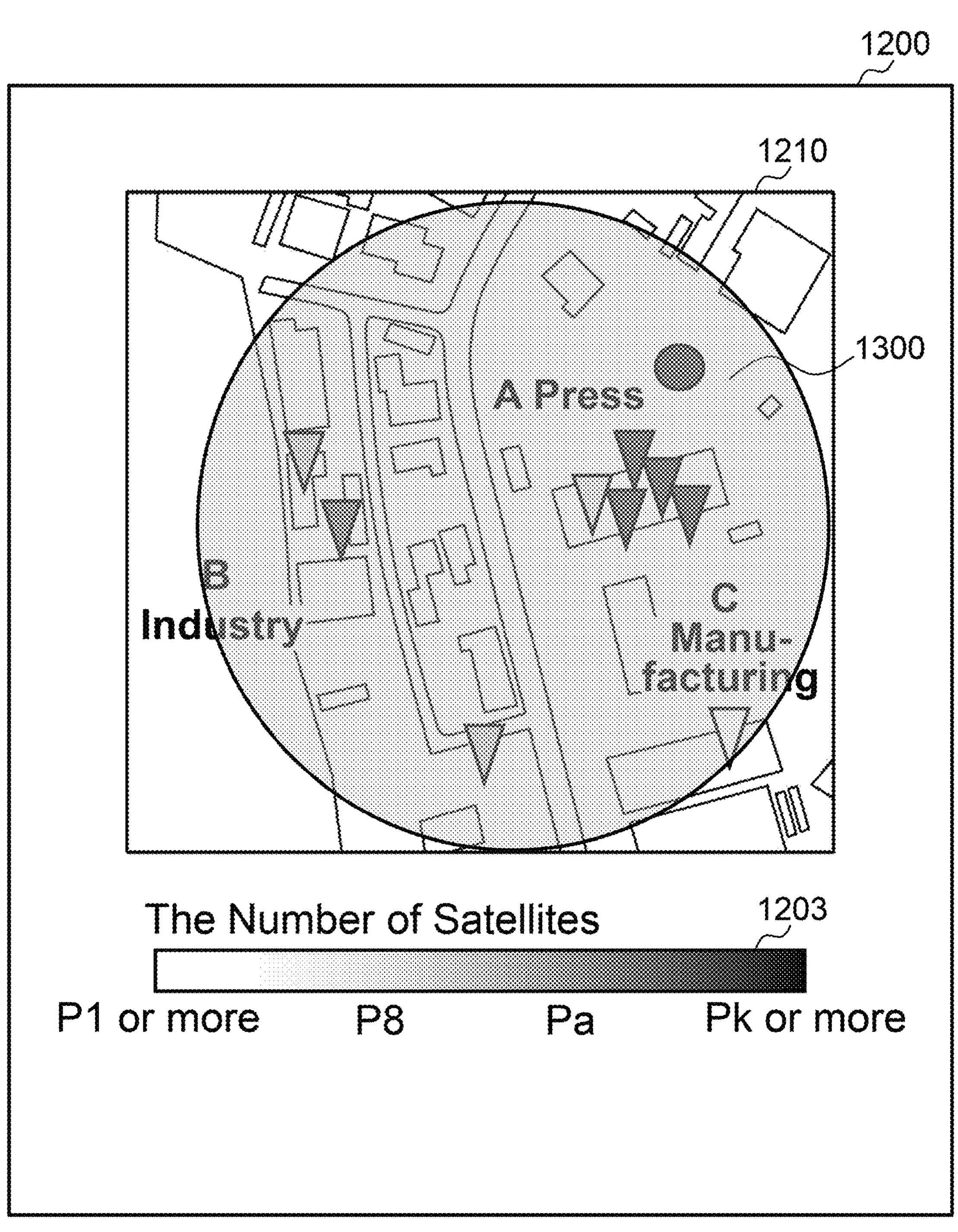
FIG. 13 illustrates another example of the product position screen.

Furthermore, the display control unit 232 may decide the range based on at least one of the n first positions and the m second positions and display a display object 1300 indicating that range on the map as illustrated in FIG. 13. Specifically, for example, the display control unit 232 may decide a base point position based on at least one of the n first positions and the m second positions and decide the range by setting that base point position as a base point (for example, a circle centered at the base point position). The decided range may range from at least one of the n first positions (and the accuracy of each first position) and the m second positions to a maximum range where the target product may possibly exist. Alternatively, the base point position may be set as a centroid computed by using accuracy information based on a plurality of positioning positions determined regarding the same one product, the number of positioning satellites which was successfully captured upon each positioning, and whether or not there is any correction by communications with the base station and the display control unit 232 can set a radius of the circle to be an average from the base point position to each determined positioning position. The display object 1300 is a shape, but may be a display object other than shapes instead of or in addition to the shapes. In an example illustrated in FIG. 13, the administrator 14 can estimate that "A Press," "B Industry," or "C Manufacturing" may possibly be the user of the target product, but there is a high possibility that the user of the target product may be "A Press."

The display control unit 232 may provisionally set the aforementioned centroid as an installation position of the product and record it in a database and that centroid may be utilized as location information of the product.

Figure 14:
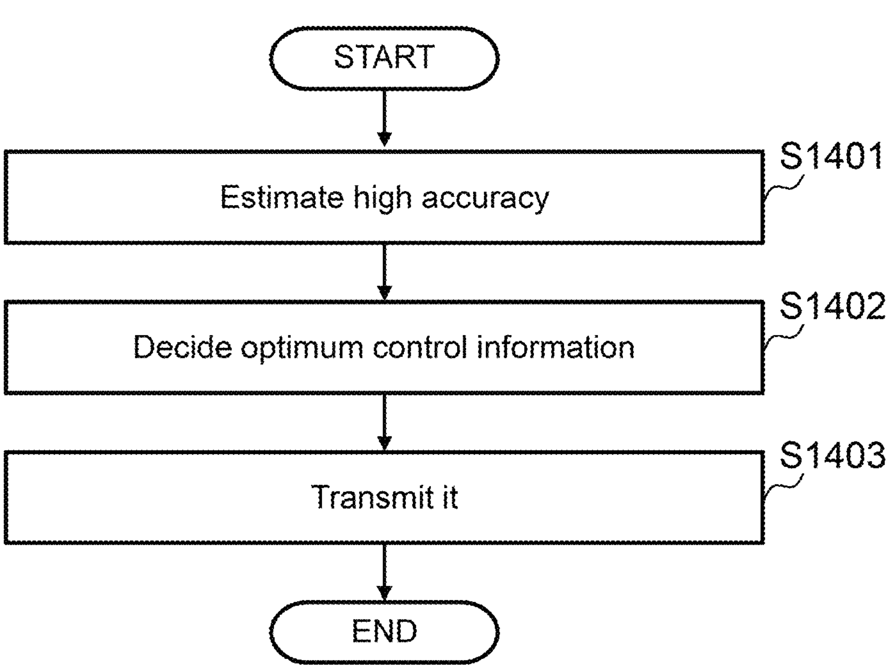
FIG. 14 illustrates an example of a flow of driving optimization processing.

FIG. 14 illustrates an example of a flow of driving optimization processing by the product management support system 13.

This processing is useful to the product 11 regarding which the content of optimum driving control (control information) depends on the altitude.

Specifically, the optimum driving decision unit 233 estimates the accuracy of the altitude of the relevant product 11 based on at least one of the n first positions and the m second positions of the relevant product 11 (for example, on the basis of latitudes and longitude degrees of single point positioning positions indicated by the N first position data sets, respectively, and the accuracy of such single point positioning positions and/or on the basis of latitudes and longitude degrees of base station positioning positions indicated by the M second position data sets, respectively, and the accuracy of such base station positioning positions) (S1401). For example, the optimum driving decision unit 233 identifies the altitude from the map data 242 by using the latitude and longitude indicated by at least one position among the n first positions and the m second positions of the relevant product 11 and estimates the accuracy of the identified altitude based on the difference between the identified altitude and the altitude indicated by the at least one position.

The optimum driving decision unit 233 decides the control information for the optimum driving control of the product 11 on the basis of the identified altitude and the estimated accuracy (S1402).

The system communication unit 231 transmits the decided control information to the product 11 (S1403). The product communication unit 214 of the product 11 receives that control information and the driving control unit 216 controls the driving target 111 in accordance with that control information.

The above description can be summarized as flows. Incidentally, the following summary may include supplementation of the above description and explanations of variations.

The product management support system 13 includes the system communication unit 231 and the display control unit 232. The system communication unit 231 receives a first position data set, which indicates a first positioning position of a shipped product 11, with the first frequency and receives a second position data set, which indicates a second positioning position of that product 11, with the second frequency. The display control unit 232 displays, on a map, at least one of n first position display objects respectively indicating n first positions based on N first position data sets and m second position display objects respectively indicating m second positions based on M second position data sets. A display mode for the n first position display objects is different from a display mode for the m second position display objects. The first positioning position and the second positioning position fall under (A) or (B) below.

(A) The first positioning position is a position determined by single point positioning which is GNSS (Global Navigation Satellite System) positioning based on signals from satellites, and the second positioning position is a position determined by base station positioning which is positioning based on radio communication with a base station.

(B) Both the first positioning position and the second positioning position are positioned determined by positioning based on signals from satellites, but the number of satellites on which the positioning of the first positioning position is based is different from the number of satellites on which the positioning of the second positioning position is based.

Consequently, the administrator 14 can accurately estimate the current position of the shipped product 11 based on the collected position data sets and, therefore, can support accurate estimation of the user of the product 11 from the current position on the map. Incidentally, the first position may be either the first positioning position or a position decided based on one or more first positioning positions. The second position may be either the second positioning position or a position decided based on one or more second positioning positions.

If the first positioning position and the second positioning position fall under (B) described above, for example, the following can be said. Specifically speaking, regardless of whether the respective positioning types of the first positioning position and the second positioning position are the same or different (for example, even if both their determined positions are single point positioning positions), position display objects can be displayed to relatively emphasize positions with a large number of positioning satellites.

If the first positioning position and the second positioning position fall under (A) described above, for example, the following can be said. Specifically speaking, the accuracy of the single point positioning is higher than the accuracy of the base station positioning, the base station positioning requires a larger communications traffic than that of the single point positioning, and the single point positioning tends to fail more easily than the base station positioning in a specified environment where at least the satellite signals can hardly be received or cannot be received (for example, indoors). A position determined by the single point positioning with relatively high accuracy and a small communications traffic is reported with the first frequency (for example, relatively high frequency); and a position determined by the base station positioning which has relatively low accuracy and a large communications traffic, but which tends to make the positioning successful more easily than the single point positioning in the specified environment is reported with the second frequency (for example, relatively low frequency). Then, the display mode for the position display object at the first position based on the first position data set indicating the single point positioning position is different from the display mode for the position display object at the second position based on the second position data set indicating the base station positioning position. Consequently, it is possible to reduce the communications traffic and collect the position data of the shipped product 11 appropriately.

The N first position data sets may be top N first position data sets with new times of day of the single point positioning (N is a natural number) among the first position data sets which have succeeded in the single point positioning. The M second position data sets may be M second position data sets whose times of day belong to a time-of-day range corresponding to the N first position data sets, and M may be an integer less than N and equal to 0 or more. Consequently, the administrator 14 can efficiently estimate the current (latest) user of the product 11.

Regarding each of the n first position display objects, the display control unit 232 sets the display mode for the relevant first position display object as a display mode according to accuracy of a single point positioning position indicated by a first position data set related to the relevant first position display object. The accuracy of the single point positioning position may be the number of satellites based on which the single point positioning position was determined. Consequently, the administrator 14 can easily identify the first position which should be prioritized in order to estimate the current position of the product 11.

The system communication unit 231 may receive a packet (s) from the product 11 with the first frequency (for example, cyclically). Each packet may include an operation data set indicating an operating status of the product 11 and a first position data set indicating a single point positioning position. Specifically speaking, the first position data set of the product 11 may be included in the packet which is transmitted to collect the operation data set. Consequently, it is possible to collect the first position data sets without increasing the communications traffic.

The system communication unit 231 may transmit a request for the base station positioning to the product 11 with the second frequency (at an arbitrary timing) and receive a second position data set in response to that request. Consequently, the product management support system 13 can adjust the frequency of the base station positioning which requires a larger communications traffic than that of the single point positioning.

The display control unit 232 may decide a range based on the n first positions and the m second positions and display a display object indicating that range on the map. Consequently, the administrator 14 can easily accurately estimate a person (for example, a company or an individual) who may possibly be the current user of the product 11.

The product management support system 13 may include the optimum driving decision unit 233. The optimum driving decision unit 233 may estimate an altitude of the product and its accuracy based on at least one of the n first positions and the m second positions and may decide control information for optimum driving control of the product 11 based on the estimated altitude and its accuracy. The system communication unit 231 may transmit the decided control information to the product 11. Consequently, it is possible to estimate the altitude of the product 11 and its accuracy by using at least one of the n first positions and the m second positions mentioned above and drive the product 11 in an optimum manner based on the estimated altitude and the accuracy.

One embodiment has been explained above; however, this is the example illustrated to explain the present invention and it is not intended to limit the scope of the present invention only to this embodiment. The present invention can be implemented in other various aspects. In one embodiment of the present invention, the product is a product which can be moved by a transfer and which can enhance the quality of product management and after-sales services by tracking its location, and the product is usually used by fixing the location at one place as an installed type. Consequently, it is possible to estimate the installation location with good accuracy by making use of the capability to accumulate data in different positioning states at a plurality of different measurement timings even if the product is installed at a position where it is difficult to confirm the location due to a reason such as the relevant place being covered with a roof.

REFERENCE SIGNS LIST

11: product
13: product management support system

The invention claimed is:

1. A product management support system comprising:

a system communication unit configured to receive at a first frequency, from satellites in a Global Navigation Satellite System (GNSS), signals including N first position data sets respectively including n first positions of a shipped product and configured to receive at a second frequency, from the satellites or via radio communication with a base station, M second position data sets respectively including m second positions of the product; and a display control unit configured to display a map, which is stored in a storage apparatus of the product management support system, and display on the map n first position display objects respectively at the n first positions based on the N first position data sets and m second position display objects respectively at the m second positions based on the M second position data sets, wherein the n first positions and the m second positions fall under (A) or (B) below:

(A) each of the n first positions is determined by single point positioning which is GNSS positioning based on the signals from the satellites, and each of the m second positions is determined by base station positioning based on the radio communication with the base station; or (B) each of the n first positions and each of the m second positions are determined by positioning based on the signals from the satellites, but the number of satellites on which the positioning of each of the n first positions is based is different from the number of satellites on which the positioning of each of the m second positions is based; and wherein the display control unit is configured to display the n first position display objects on the map with a display characteristic, including at least one of shape, color, color intensity, or transmissivity, that is different from the m second position display objects.

2. The product management support system according to claim 1, wherein the n first positions and the m second positions fall under (A);

wherein the second frequency is lower than the first frequency;

wherein each of the n first positions is either a single point positioning position or a position decided based on one or more single point positioning positions; and wherein each of the m second positions is either a base station positioning position or a position decided based on one or more base station positioning positions.

3. The product management support system according to claim 1, wherein the n first positions and the m second positions fall under (A);

wherein the N first position data sets are top N first position data sets with new times of day (Nis a natural number) among the first position data sets which have succeeded in the single point positioning; and wherein the M second position data sets are M second position data sets whose times of day belong to a time-of-day range corresponding to the N first position data sets, and Mis an integer less than N and equal to 0 or more.

4. The product management support system according to claim 1, wherein the n first positions and the m second positions fall under (A); and wherein, for each of the n first position display objects, the display control unit is configured to display the first position display object based on an accuracy of a single point positioning position indicated by a first position data set related to the first position display object.

5. The product management support system according to claim 4, wherein the accuracy of the single point positioning position is determined based on the number of satellites.

6. The product management support system according to claim 1, wherein the n first positions and the m second positions fall under (A);

wherein the system communication unit is configured to receive packets from the product with the first frequency; and wherein each packet includes an operation data set indicating an operating status of the product and a first position data set indicating a single point positioning position.

7. The product management support system according to claim 1, wherein the n first positions and the m second positions fall under (A); and wherein the system communication unit is configured to transmit a request for the base station positioning to the product with the second frequency and receives a second position data set in response to the request.

8. The product management support system according to claim 1, further comprising an optimum driving decision unit configured to estimate an altitude of the product and its accuracy based on at least one of the n first positions and the m second positions and decides control information for optimum driving control of the product on the basis of the estimated altitude and its accuracy, wherein the system communication unit is configured to transmit the decided control information to the product.

9. A system comprising:

a shipped product; and a product management support system that manages the product, wherein the product management support system is configured to:

receive at a first frequency, from satellites in a Global Navigation Satellite System (GNSS), signals including N first position data sets respectively including n first positions of the product;

receive at a second frequency, from the satellites or via radio communication with a base station, M second position data sets respectively including m second positions of the product;

display a map, which is stored in a storage apparatus of the product management support system, and display on the map n first position display objects respectively at the n first positions based on the N first position data sets and m second position display objects respectively at the m second positions based on the M second position data sets, wherein the n first positions and the m second positions fall under (A) or (B) below:

(A) each of the n first positions is determined by single point positioning which is GNSS positioning based on the signals from the satellites, and each of the m second positions is determined by base station positioning based on radio communication with the base station; or (B) each of the n first positions and each of the m second positions are determined by positioning based on the signals from the satellites, but the number of satellites on which the positioning of each of the n first positions is based is different from the number of satellites on which the positioning of each of the m second positions is based; and wherein the display control unit is configured to display the n first position display objects on the map with a display characteristic, including at least one of shape, color, color intensity, or transmissivity, that is different from the m second position display objects.

10. A product management support method, comprising:

receiving, by a computer, at a first frequency from satellites in a Global Navigation Satellite System (GNSS), signals including N first position data sets respectively including n first positions of a shipped product;

receiving, by the computer, at a second frequency, from the satellites or via radio communication with a base station, M second position data sets respectively including m second positions of the product; and displaying, by the computer, a map, which is stored in a storage apparatus of a product management support system, and displaying on the map n first position display objects respectively at the n first positions based on the N first position data sets and m second position display objects respectively at the m second positions based on the M second position data sets; and wherein the n first positions and the m second positions fall under (A) or (B) below:

(A) each of the n first positions is determined by single point positioning which is GNSS positioning based on the signals from the satellites, and each of the m second positions is determined by base station positioning based on radio communication with the base station; or (B) each of the n first positions and each of the m second positions are positioned by positioning based on the signals from the satellites, but the number of satellites on which the positioning of each of the n first positions is based is different from the number of satellites on which the positioning of each of the m second positions is based; and wherein the display control unit is configured to display the n first position display objects on the map with a display characteristic, including at least one of shape, color, color intensity, or transmissivity, that is different from the m second position display objects.

* * * * *